United States Patent [19]

Toyoda et al.

[11] Patent Number: 4,465,285
[45] Date of Patent: Aug. 14, 1984

[54] VARIABLE CONTACT CENTRIFUGALLY OPERATED SEAL MECHANISM

[75] Inventors: Hiroaki Toyoda, Anjo; Minoru Kinbara, Toyota; Akira Nakai, Hekinan, all of Japan

[73] Assignee: Aisin Seiki Kabushiki Kaisha, Kariya, Japan

[21] Appl. No.: 344,529

[22] Filed: Feb. 1, 1982

[30] Foreign Application Priority Data

Jan. 30, 1981 [JP] Japan .............................. 56-12622[U]

[51] Int. Cl.³ .................... F16J 15/32; F16J 15/38; F16J 15/54
[52] U.S. Cl. ...................................... 277/25; 277/65; 277/93 SD; 277/152
[58] Field of Search ....................... 277/25, 24, 65, 84, 277/152, 153, 212 R, 212 F, 212 C, 93 SD, 133, 134, 166; 308/187.1, 187.2

[56] References Cited

U.S. PATENT DOCUMENTS

| | | | |
|---|---|---|---|
| 2,352,784 | 7/1944 | Geyer | 277/65 X |
| 2,418,707 | 4/1947 | Groot | 277/25 |
| 2,438,457 | 3/1948 | Schlosser | 277/65 |
| 2,478,649 | 8/1949 | Wightman | 277/25 |
| 2,818,284 | 12/1957 | Stevens | 277/65 |
| 2,936,715 | 5/1960 | Southam et al. | 277/25 X |
| 3,028,181 | 4/1962 | Thompson et al. | 277/25 X |
| 3,895,811 | 7/1975 | Richard et al. | 277/65 X |
| 4,204,716 | 5/1980 | Baylor | 277/92 X |
| 4,285,526 | 8/1981 | Klinteberg et al. | 277/153 |

FOREIGN PATENT DOCUMENTS

| | | | |
|---|---|---|---|
| 636923 | 2/1962 | Canada | 308/187.2 |
| 739827 | 10/1943 | Fed. Rep. of Germany | 277/65 |
| 936483 | 2/1948 | France | 277/25 |
| 299483 | 8/1965 | Netherlands | 277/25 |
| 618347 | 2/1949 | United Kingdom | 277/95 |

Primary Examiner—Robert S. Ward
Attorney, Agent, or Firm—Oblon, Fisher, Spivak, McClelland & Maier

[57] ABSTRACT

A variable contact seal mechanism which includes a rotatable shaft, a seal body having a wall member, and a seal member having a cylindrical portion secured onto the rotatable shaft and a tongue portion resiliently slidably contacting the seal wall such that continuous resilient contact force of the tongue portion with the wall is changed in response to rotational speed of the shaft. A bearing member is utilized which rotatably supports the shaft along with a mechanical sealing mechanism mounted so as to surround the shaft wherein the seal member is disposed between the bearing and the mechanical sealing mechanism.

4 Claims, 4 Drawing Figures

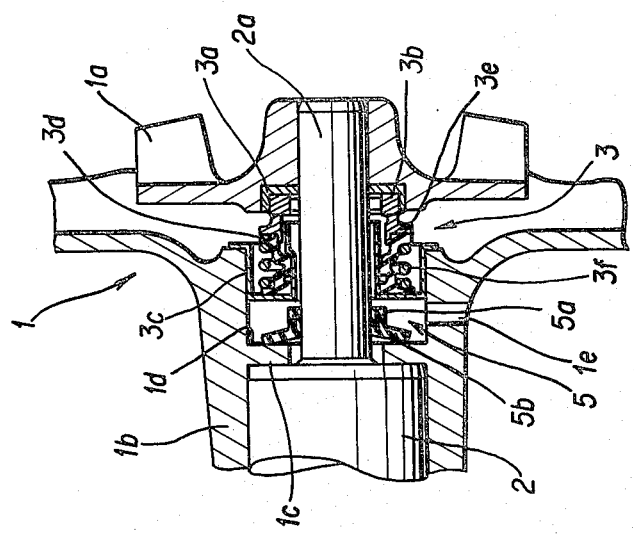
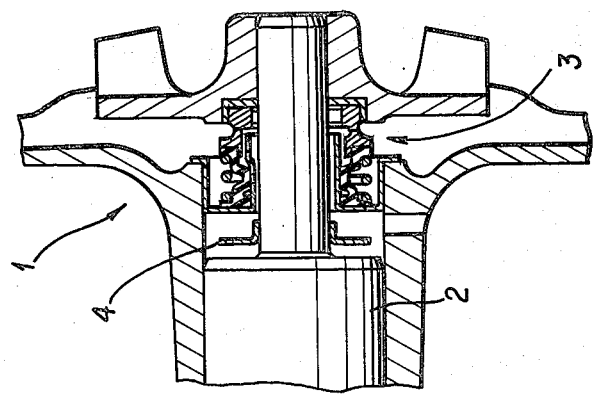
FIG. 1 PRIOR ART
FIG. 2

VARIABLE CONTACT CENTRIFUGALLY OPERATED SEAL MECHANISM

BACKGROUND OF THE INVENTION

1. Field of the Invention

This invention relates to a variable contact seal mechanism and, more particularly, to a seal mechanism in which the resilient contact force of a seal member which is in contact with seal wall changes in response to rotational speed of a shaft.

2. Description of the Prior Art

FIG. 1 shows a conventional seal mechanism which is utilized, for example, in a water pump device 1 for vehicles. In order to prevent inundation of water, steam and the like into bearing portion 2, a mechanial sealing mechanism 3 and rotational disk 4 are provided. In this prior art mechanism, however, inundation or steam, especially will not be completely prevented and bearing portion 2 may become rusted.

SUMMARY OF THE INVENTION

It is therefore an object of the prevent invention to provide an improved variable contact seal mechanism which obviates the conventional disadvantages mentioned hereinabove.

Another object of the present invention is to provide an improved seal mechanism which is low in rotational sliding resistance.

In accordance with the present invention, a seal mechanism is provided which includes a rotatable shaft, a seal body having a wall member, and a seal member which further includes a cylindrical portion secured onto the rotatable shaft and a tongue portion resiliently slidably contacting the seal wall such that resilient contact force of the tongue portion with the wall is changed in response to rotational speed of the shaft.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein:

FIG. 1 is a cross sectional view showing a conventional seal mechanism which is applied to water pump device;

FIG. 2 is a view similar to FIG. 1 but showing a preferred embodiment of the present invention;

DETAILED DESCRIPTION OF THE PREFERRED EMBODIMENT

Figure 4:
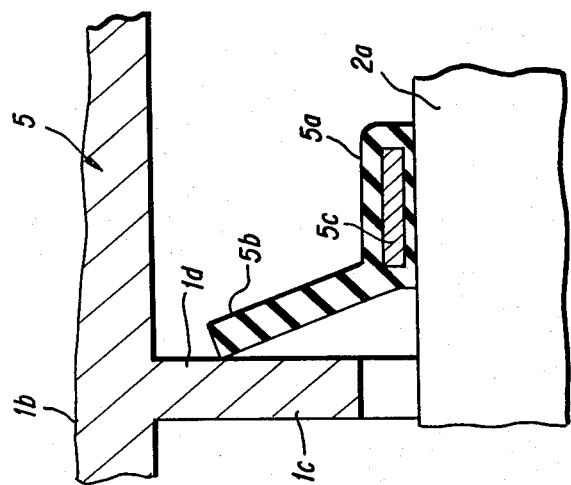
FIG. 4 is a view similar to FIG. 3, but showing an operation condition.
Figure 3:
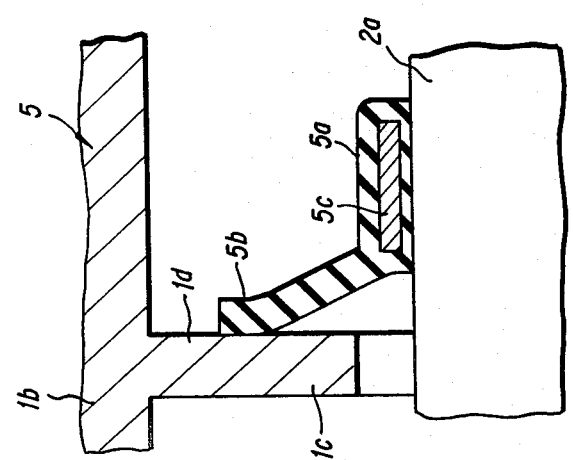
FIG. 3 is an enlarged cross sectional view of the variable contact seal member of FIG. 2 showing a nonoperating condition.

In FIGS. 2 to 4, showing the present invention which is applied, for example, in a water pump device 1, a pump impeller 1a is secured to a shaft 2a rotationally supported by a bearing 2. A conventional mechanical sealing mechanism 3 is positioned between bearing 2 and impeller 1a.

The mechanical sealing mechanism 3 includes a holder 3a secured to impeller 1a, a plate 3b of pottery material secured to holder 3a, a holder 3c positioned in body 1b, a bellows 3d positioned on holder 3c and having a contact member 3e of carbon, and a spring 3f biasing a member 3e towards plate 3b. A seal member 5 is arranged between bearing 2 and mechanical sealing mechanism 3.

Seal member 5 includes a cylindrical portion 5a to thereby be secured on shaft 2a and sealing tongue portion 5b extending exclusively from an axial end corner portion of cylindrical portion 5a with a prescribed angle of inclination to thereby be in continuous resilient contact with side surface 1d of seal wall 1c provided on body 1b as shown in FIG. 3. Cylindrical portion 5a includes a metallic central core member 5c for strengthening seal member 5. Reference numeral 1e denotes a hole to drain water and wall 1c functions as stopper for bearing 2 and is oriented substantially transverse to the longitudinal axis of shaft 2a.

FIG. 3 shows sealing member 5 when shaft 2a does not rotate. In this condition, tongue portion 5b is in continuous resilient contact with side surface 1d of wall 1c. When shaft 2a is rotated, the shape of tongue portion 5b will be changed as shown in FIG. 4 due to centrifugal force but still will contact side surface 1d of wall 1c. Thus, resilient contact force will decrease in response to rotational speed of shaft 2a. By "resilient contact force" is meant the fact that tongue portion 5b is in contact with side surface 1d and slides thereon. This tongue portion 5b per se has an inherent resilient force to complete a continuous sealing function with wall 1c. This results in a decrease in rotational sliding resistance of seal member 5.

Water at 18~120 degrees centigrade around impeller 1a may become steam due to frictional heat (20~30 degrees centigrade) generated by friction between plate 3b and member 3e. Such steam can thus be prevented from communicating with bearing 2 because of the arrangement of seal member 5 and may drain out through hole 1e.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A variable contact seal mechanism comprising:
   a rotatable shaft;
   a seal body having a wall member which includes a side surface disposed substantially transverse to the longitudinal axis of said shaft; and
   a seal member which further comprises a cylindrical portion secured onto said rotatable shaft and having a metallic central core member disposed therein for strengthening said seal member, a tongue portion extending exclusively from an axial end portion of said cylindrical portion with a prescribed angle of inclination and resiliently, slidably, and continuously contacting said side surface of said seal wall such that resilient contact force of said tongue portion with said wall decreases in response to an increase in rotational speed of said shaft, and means for maintaining said tongue portion in continuous contact with said wall both when said shaft is rotating and not rotating.

2. A seal mechanism as set forth in claim 1, further comprising:

a bearing member rotatably supporting said shaft; and
a mechanical sealing mechanism mounted so as to surround said shaft wherein said seal member is disposed between said bearing member and said mechanical mechanism.

3. A seal mechanism as set forth in claim 2, wherein said seal wall is disposed between said seal member and said bearing member.

4. A variable contact seal mechanism as set forth in claim 1, wherein said tongue portion extends from an axial end corner portion of said cylindrical portion.

* * * * *